United States Patent [19]
Kikuchi et al.

[11] Patent Number: 5,643,385
[45] Date of Patent: Jul. 1, 1997

[54] METHOD OF MANUFACTURING ARTICLE INCLUDING INTEGRATED COVER MATERIAL

[75] Inventors: Masanobu Kikuchi; Norio Yanagishita; Koji Yamada, all of Ayase, Japan

[73] Assignee: Ikeda Bussan Co.,Ltd., Ayase City, Japan

[21] Appl. No.: 643,496

[22] Filed: May 6, 1996

Related U.S. Application Data

[63] Continuation of Ser. No. 289,575, Aug. 12, 1994, abandoned.

[30] Foreign Application Priority Data

Apr. 5, 1994 [JP] Japan ................... 6-090532

[51] Int. Cl.$^6$ ................................................ B32B 31/12
[52] U.S. Cl. ............... 156/212; 156/214; 156/272.2; 156/322; 297/DIG. 1; 297/DIG. 2
[58] Field of Search .................... 156/212, 214, 156/380.9, 213, 228, 309.9, 322; 297/DIG. 1, DIG. 2; 219/443, 456, 465, 553; 264/46.4

[56] References Cited

U.S. PATENT DOCUMENTS

| | | | |
|---|---|---|---|
| 2,263,350 | 11/1941 | Challet | 219/456 |
| 3,850,725 | 11/1974 | Spielau et al. | 156/322 X |
| 4,758,294 | 7/1988 | Storch | 156/212 |
| 4,818,331 | 4/1989 | Shimada | 156/213 X |
| 4,874,448 | 10/1989 | Urai | 156/228 X |
| 4,929,304 | 5/1990 | Urai et al. | 156/245 |
| 5,232,543 | 8/1993 | Frelich et al. | 156/497 |
| 5,286,325 | 2/1994 | Miyota et al. | 156/212 |
| 5,395,473 | 3/1995 | Nixon | 156/291 |
| 5,486,252 | 1/1996 | Wong | 156/212 |

FOREIGN PATENT DOCUMENTS 2202435  7/1988  United Kingdom .

OTHER PUBLICATIONS

Patent Abstract of Japan, vol. 015 No. 228 (M–1123), Jun. 11, 1991, & JP–A–03 068391 (Araco Corp; Others: 01) 25 Mar. 1991.

Database WPI Section Ch, Week 9317 Derwent Publications Ltd., London, GB; Class A32, An 93–139646 & JP–A–05 076 664 (Tokyo Seat KK), Mar. 30, 1993.

*Primary Examiner*—Michele K. Yoder
*Attorney, Agent, or Firm*—Foley & Lardner

[57] ABSTRACT

A method of integrally bonding a foam seat pad or other article to a cover material, includes steps of coating a main surface of the pad with a heat activated adhesive. Then, the pad is affixed to an upper mounting member. A lower mounting member is positioned opposite the upper mounting member and the cover material is disposed on the lower mounting member. Heating is applied to the adhesive coating the main surface of the pad, and when sufficient heat is applied the upper and lower mounting members are pressed together for a predetermined time period. Clamps are provided on the mounting members for surely positioning the pad relative the cover material. Thus, accurate positioning and strong bonding are reliably assured.

15 Claims, 3 Drawing Sheets

METHOD OF MANUFACTURING ARTICLE INCLUDING INTEGRATED COVER MATERIAL

This application is a continuation, of application Ser. No. 08/289,575, filed Aug. 12, 1994 now abandoned.

BACKGROUND OF THE INVENTION

1. Field of the Invention

The present invention relates generally to a adhering method for a surface material. In particular, the present invention relates to a one step method of forming upholstered articles for automotive vehicle interiors in which a cover material is affixed to a foam pad or the like for forming automotive seats etc.

2. Description of the Related Art

Generally, in manufacturing of automotive seats, upholstery and the like, a cover material is shaped so as to cover a pad material and adhesive is applied to at least one side of the pad and cover material for integrally joining the pad and cover material for forming a finished seat cushion, or the like.

One such method of joining a pad and cover material according to a reaction type hot melt is disclosed in Japanese Patent Application (Unexamined) 3-68391. According to this method, when the pad and cover materials are brought together under pressure, heating is applied to the out outer side of the cover material for activating the hot melt to effect joining of the cover material to the pad.

At this, when the pad and cover material are subjected to pressure since heat (i.e. steam heating or the like) must be applied through the cover material so as to set the hot melt adhesive to the inner side of the cover material, heat is applied to the outer side (surface) of the cover material which is potentially damaging to the material.

Further, the method according to the above-mentioned Japanese application requires that a pressure adhesion step for setting of the hot melt type adhesive be carried out for a substantially long time.

SUMMARY OF THE INVENTION

It is therefore a principal object of the present invention to overcome the drawbacks of the related art.

It is a further object of the present invention to provide a simplified process for manufacturing an article with a skin, or cover layer integrally joined thereto.

In order to accomplish the aforementioned and other objects, a method of forming an article including an integral cover material is provided, comprising: coating a main surface of the article with a heat activated adhesive; positioning the article on a first mounting member; disposing a sheet of the cover material on a second mounting member such that the cover material is faced toward the main surface of the article; applying heating to the main surface for activating the adhesive; and pressingly moving together the first and second mounting members such that the cover material is pressingly contacted with the main surface of the article for a predetermined time period.

DESCRIPTION OF THE PREFERRED EMBODIMENT

Figure 1A:
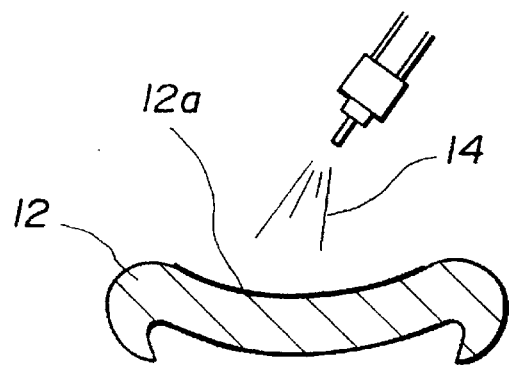
FIGS. 1(a)–1(c) are diagrams showing steps and materials required for carrying out the method according to a first embodiment of the invention.
Figure 1B:
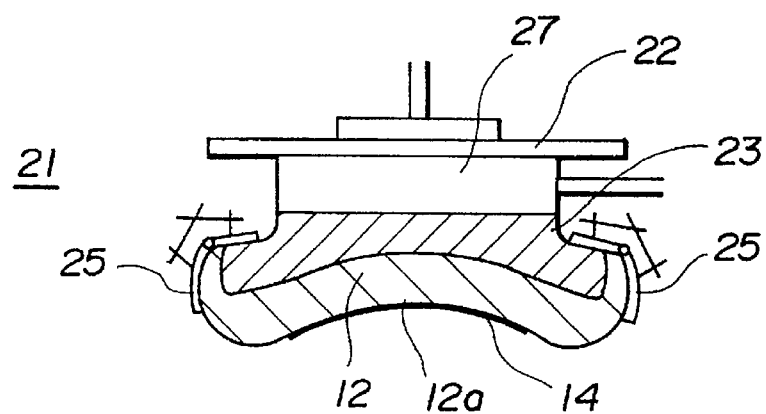
Figure 1C:
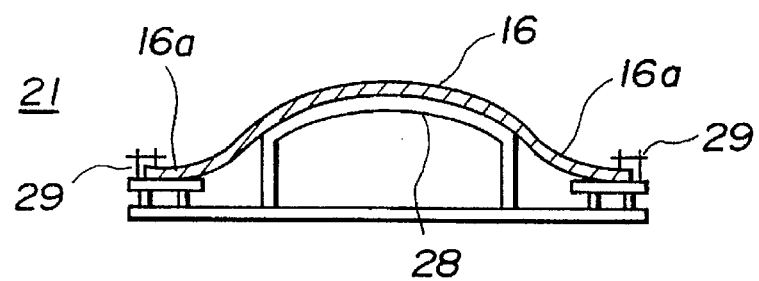

Referring now to the drawings, particularly to FIGS. 1(a)–(c), a first embodiment of the invention will be described hereinbelow in detail.

First an article, is formed of synthetic resin foam, for example, into a desired shape such as a seat cushion 12 and a substantially large surface 12a thereof to be adhered to a cover material is coated with a reaction type hot melt adhesive 14.

Then, according to the method of the invention, the seat cushion 12 is mounted to a stand 28 of a first (upper) apparatus 22. The surface 12a prepared with the adhesive 14 which is to be joined to a covering material 16 (FIG. 1(c)) is faced in the downwards direction.

The hot melt adhesive 14 may be of a moisture hardening polyester type with isocyanate prepolymer as a main component therof. Hardening of such a reaction type holt melt adhesive being effected with ultra violet or electrical irradiation or the like. Also, any other type of reaction type hotmelt adhesive may also be used.

According to this, the volume of adhesive 14 applied to the surface 12a may be adjusted as desired between 50–100 g/m$^2$, according to the present embodiment, a volume of 70 g/m$^2$ has been utilized.

Next, referring to FIG. 1(b), an upper mold 22 of a processing apparatus 21 is provided with a mounting stand 23 on which the pad 12 is mounted so as to expose the ahesive coated main surface 12a in the downward direction. That is, the pad 12 is preliminarily positioned on the mounting stand 23 which is associated with a vaccum suction unit 27 for retaining the pad 12, then clamps 25, 25 are closed for finally and accurately positioning the pad 12.

Referring now to FIG. 1(c), a lower mold 28 of the processing apparatus 21 retains a sheet 16 of cover material such that a reverse side of the sheet 16 is faced upwardly. Further, edge portions 16a at each side of the sheet 16 are retained by clamps 29, 29. It will be understood that, according to the present invention, various types of clamp means may be utilized.

Figure 2:
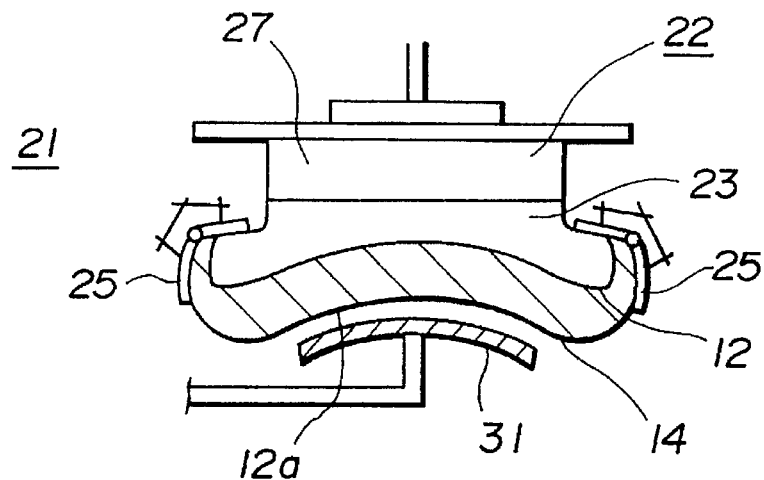
FIG. 2 shows an adhesive heating step according to the process of the invention.

Referring now to FIG. 2, when the pad 12 is suitably positioned on the upper mold 22, a heater 31 is disposed at a position under the main surface 12a coated with the adhesive 14. The heat from ther heater 31 serves to activate the reaction type hot melt adhesive 14 to prepare for bonding to the cover material 16. For effecting sufficient activation of the adhesive 14, the heater 31 is positioned spaced from the main surface 12a by a clearance of about 10 mm.

The heater 31 may effect heating from about 60°–200° C., preparation of the adhesive 14 according to the present embodiment is carried out by setting the heater to approximately 150° C. Such a temperature, positioned facing the main surface 12a of the pad 12 at the 10 mm clearance, will heat the reaction type hot melt adhesive 14 to a temperature of 60° C. in approximately 4–5 seconds.

Figure 3:
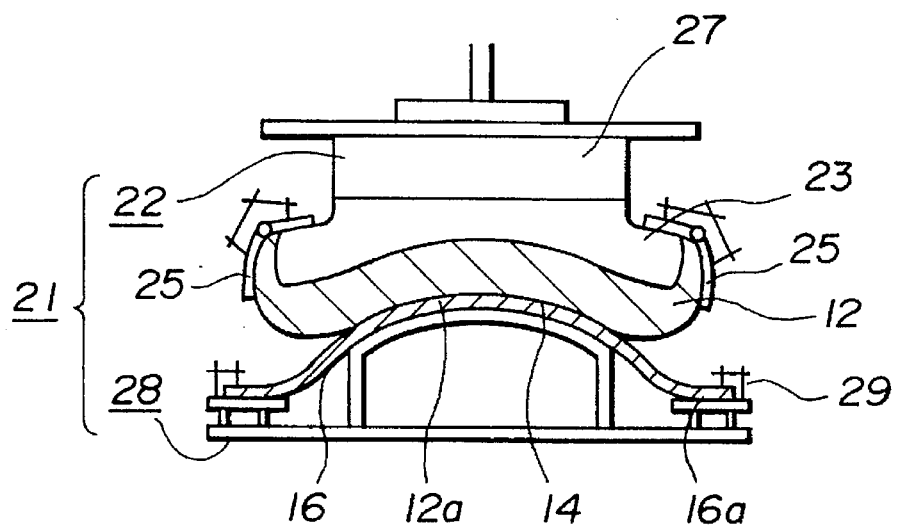
FIG. 3 shows a pressing step for joining a cover material to a pad material according to the process of the invention.

Next, referring now to FIG. 3, the processing apparatus 21 is active to pressingly bring together the upper mold 22 and the lower mold 28 such that the main surface 12a of the pad is brought into contact with the reverse surface of the sheet 16, and the heated adhesive 14 bonds the main surface 12a to the reverse surface of the cover material sheet 16. According to the present invention, pressing contact between the main surface 12a and the reverse side of the sheet 16 is maintained for 15–60 seconds according to pressure between the upper mold 22 and the lower mold 28.

According to the present embodiment, the processing apparatus 21 may bring the upper and lower molds 22, 28 together at a pressure of 0.01–0.1 kg/cm$^2$.

It will be noted that, although, according to the above described embodiment, the pad 12 is provided on an upper mold and the sheet 16 on a lower mold of the processing apparatus 21, the reverse arrangement is also possible. Further, although the embodiment teaches that the adhesive 14 is applied to a main surface 12a of the pad 12, the adhesive 14 may alternatively be applied to the reverse side of the sheet 16 or, both the main surface 12a and the sheet 16 may be coated with the reaction type hot melt adhesive 14.

Figure 4:
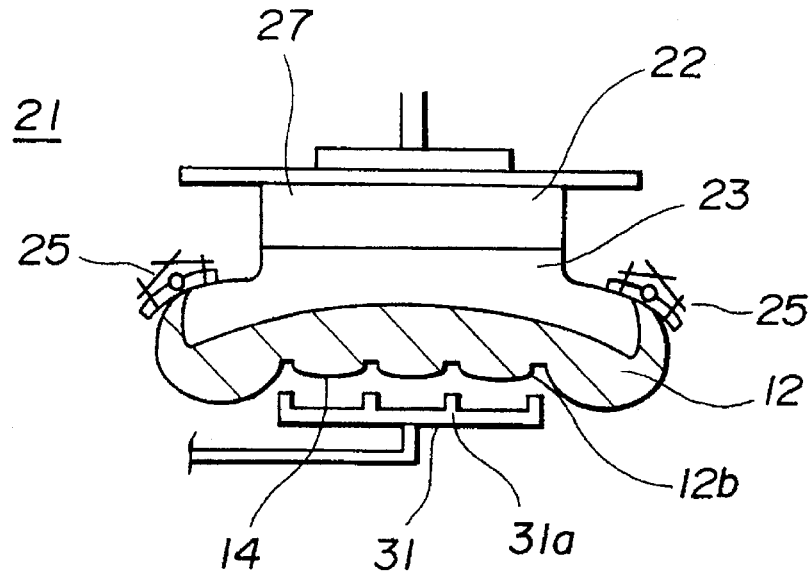
FIG. 4 is a cross-sectional view of an alternative embodiment of the process of the invention.
Figure 5:
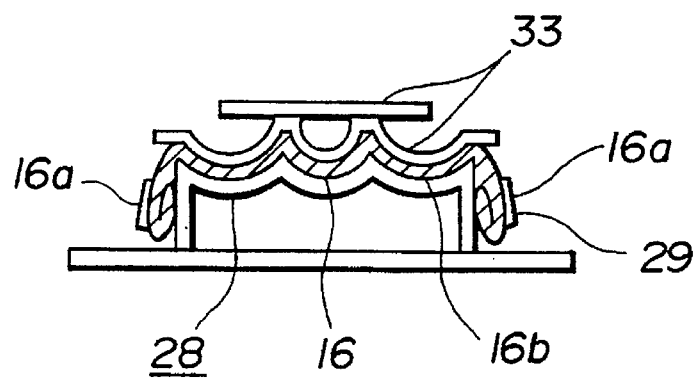
FIG. 5 is a cross-sectional view of yet another alternative embodiment of the process of the invention.

Referring now to FIGS. 4 and 5, an alternative embodiment of the present invention will be described, for brevity, like numerals will be used to denote like parts of the second embodiment.

As may be seen in FIG. 4, the pad 12 of the second embodiment is formed with a pattern 12b as the main surface thereof. Accordingly, the heater 31 is formed with pattern portions 31a corresponding to the pattern 12b for providing appropriate heating thereto.

In FIG. 5, the lower mold 28 is formed with a pattern corresponding to the pattern of the pad 12. Further, a pressing member 33 is provided at an upper side of the lower mold 28 having a configuration mating with that of the pattern of the lower mold 28 such that when the sheet 16 is pressed between the lower mold 28 and the pressing member 33, shaped portions 16b are formed for shaping the sheet 16 so as to be compatible with the pattern 12b of the pad 12. Thus, according to the present embodiment, heating and pressing steps may be carried out simultaneously at the upper and lower molds respectively, then the upper and lower molds are brought pressingly together as with the above-described first embodiment. Also, as in the first embodiment, the present embodiment employs clamp means including upper clamps 25 and lower clamps 29 for surely retaining the pad 12 and the edge portions 16b of the sheet 16.

Thus, according to the invention, the pad 12 and the sheet 16 may be brought together with highly accurate positioning and suitable heating and pressure such that the quality of articles bonded in this manner is assured to be high.

Also, since the heating means 31 is active to heat the reaction type hot melt adhesive 14 in close proximity thereto, the activation time for the adhesive 14 can be kept substantially short and a strong durable bond can be formed.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method of integrally bonding an article and a cover material, comprising the steps of:

coating a main surface of said article with a heat-activated adhesive;

positioning said article on an upper mounting member such that said main surface is directed downwardly;

disposing a sheet of said cover material on a lower mounting member such that a reverse side of said cover material is faced toward said main surface of said article;

applying clamping means to said article and said cover material so as to establish a positional relationship therebetween;

directly irradiating only said main surface from below with a heating member to activate said adhesive;

wherein said main surface is formed With a patterned texture and said heating member has a configuration conforming to said pattern, and moving together said upper and lower mounting members after said irradiating step such that said cover material is pressingly contacted with said main surface of said article for a duration sufficient to set said adhesive.

2. A method as set forth in claim 1, wherein said heating member is positioned adjacent to said main surface at a clearance selected so as to provide sufficient activation of the adhesive.

3. A method as set forth in claim 1, wherein said duration sufficient to set said adhesive is greater than or equal to 15 seconds and less than or equal to 60 seconds.

4. A method as set forth in claim 1, wherein vacuum suction means is integrated with said upper mounting member and utilized in addition to said clamping means to achieve said positional relationship.

5. A method as set forth in claim 1, wherein said upper and lower mounting members are pressingly moved together so as to establish a pressure therebetween of between 0.01–0.1 kg/cm$^2$.

6. A method as set forth in claim 1, wherein said heat-activated adhesive having isocyanate prepolymer as a main component thereof.

7. A method as set forth in claim 1, further including a step, after said disposing step and before said moving together step, of applying a pressing member to said cover material after said cover material has been disposed on said lower mounting member, said lower mounting member being contoured according to said patterned surface of said main surface, and said pressing member pressingly configuring a contour of said cover material to correspond to said patterned main surface of said article.

8. A method as set forth in claim 1, wherein the article comprises a foamed synthetic resin.

9. A method as set forth in claim 1, wherein from 50 to 100 g/m$^2$ of the heat activated adhesive are applied to the main surface of the article during the coating step.

10. A method as set forth in claim 1, wherein the irradiating comprises heating the adhesive at from about 60° to 200° C.

11. A method as set forth in claim 1, further comprising applying a heat-activated adhesive to the reverse side of said cover material prior to said moving step.

12. A method of integrally bonding an article and a cover material, comprising the steps of:

coating a main surface of said article with a heat activated adhesive;

positioning said article on a first mounting member such that said main surface is directed away from the first mounting member;

disposing a sheet of said cover material on a second mounting member such that a reverse side of said cover material is faced toward said main surface of said article;

applying clamping means to said article and said cover material so as to establish a positional relationship therebetween;

directly irradiating only said main surface with a heating member to activate said adhesive;

wherein said main surface is formed with a patterned texture and said heating member has a configuration conforming to said pattern, and moving together said first and second mounting members after said irradiating step, such that said cover material is pressingly contacted with said main surface of said article for a duration sufficient to set said adhesive.

13. A method as set forth in claim 12, wherein said first mounting member is a lower mounting member and said second mounting member is an upper mounting member.

14. A method as set forth in claim 12, further including after said disposing step and before said moving together step, a step of applying a pressing member to said cover material after said cover material has been disposed on said second mounting member, said second mounting member being contoured according to said patterned surface of said main surface, and said pressing member pressingly configuring a contour of said cover material to correspond to said patterned main surface of said article.

15. A method of integrally bonding an article and a cover material, comprising the steps of:

positioning said article on a first mounting member such that a main surface thereof is directed away from the mounting member;

disposing a sheet of said cover material having a surface coated with a heat-activated adhesive, on a second mounting member such that the surface of said cover material coated with a heat-activated adhesive is faced toward said main surface of said article;

applying clamping means to said article and said cover material so as to establish a positional relationship therebetween;

directly irradiating with a heating member only said surface of said sheet to activate said adhesive;

wherein said main surface is formed with a patterned texture and said heating member has a configuration conforming to said pattern, and moving together said mounting members after said irradiating step such that said cover material is pressingly contacted with said main surface of said article for a duration sufficient to set said adhesive.

\* \* \* \* \*